US012680342B2

(12) United States Patent
Sandoval, Jr. et al.

(10) Patent No.: US 12,680,342 B2
(45) Date of Patent: Jul. 14, 2026

(54) STATUS INDICATING LOCKSET TRIMS

(71) Applicant: Schlage Lock Company LLC, Carmel, IN (US)

(72) Inventors: Jaime Sandoval, Jr., Colorado Springs, CO (US); Ashwin Hanumant Bajikar, Belagavi (IN); Nathanael Taylor, Colorado Springs, CO (US)

(73) Assignee: Schlage Lock Company LLC, Carmel, IN (US)

( * ) Notice: Subject to any disclaimer, the term of this patent is extended or adjusted under 35 U.S.C. 154(b) by 49 days.

(21) Appl. No.: 18/776,681

(22) Filed: Jul. 18, 2024

(65) Prior Publication Data

US 2026/0022586 A1 Jan. 22, 2026

(51) Int. Cl.
*E05B 41/00* (2006.01)
*E05B 9/02* (2006.01)

(52) U.S. Cl.
CPC ................ *E05B 41/00* (2013.01); *E05B 9/02* (2013.01)

(58) Field of Classification Search
CPC . E05B 41/00; E05B 9/02; E05B 39/00; E05B 9/002
See application file for complete search history.

(56) References Cited

U.S. PATENT DOCUMENTS 689,429 A * 12/1901 Smith ..................... E05B 41/00 40/907
1,216,899 A * 2/1917 Weyer ..................... E05B 41/00 40/907
1,393,149 A * 10/1921 Matchette ............. E05B 63/048 40/907
3,304,756 A * 2/1967 Eads ....................... E05B 41/00 116/80
9,845,620 B2 12/2017 Bronner
11,486,163 B2 11/2022 Sweeney et al.
2015/0240526 A1* 8/2015 Clary ...................... E05B 15/02 70/432
2019/0368226 A1* 12/2019 Sweeney ................. E05B 15/02
2020/0408002 A1 12/2020 Woodley et al.
2021/0230903 A1* 7/2021 Fournier ................. E05B 39/00
2022/0235576 A1* 7/2022 Basavaraju ......... E05B 27/0092
2023/0041148 A1 2/2023 Sweeney et al.

FOREIGN PATENT DOCUMENTS

KR 820001297 Y1 * 6/1982 ............. E05B 41/00

* cited by examiner

*Primary Examiner* — Christine M Mills
*Assistant Examiner* — Peter H Watson
(74) *Attorney, Agent, or Firm* — Taft Stettinius & Hollister LLP

(57) ABSTRACT

An exemplary lockset trim generally includes an escutcheon, a cam, a slider, and an indicator mechanism. The cam is rotatably mounted in the escutcheon for rotation about a longitudinal axis between a first rotational position and a second rotational position. The slider is mounted in the escutcheon and engaged with the cam. The indicator mechanism is mounted in the escutcheon for movement between a first indicator state, in which a first indicium is visible via a window in the escutcheon, and a second indicator state, in which a second indicium is visible via the window. The indicator mechanism is engaged with the cam via the slider such that the indicator mechanism adopts the first indicator state in response to the cam adopting the first rotational position and adopts the second indicator state in response to the cam adopting the second rotational position.

21 Claims, 15 Drawing Sheets

STATUS INDICATING LOCKSET TRIMS

TECHNICAL FIELD

The present disclosure generally relates to status indicating locksets, and more particularly but not exclusively relates to trims for deadbolt locksets.

BACKGROUND

Indicator mechanisms are occasionally provided to locksets to provide a visual indication regarding the locked/unlocked state of the lockset. For example, certain deadbolt locksets are provided with a rotatable indicator that is rotationally coupled with the tailpiece of a lock cylinder such that there is a direct correspondence between the rotational position of the tailpiece and the rotational position of the indicator. However, this arrangement may be susceptible to tampering attacks. For example, if an attacker is able to tamper with the sign, the attacker may be able to force the sign to rotate the tailpiece, thereby unlocking the lockset. For these reasons among others, there remains a need for further improvements in this technological field.

SUMMARY

An exemplary lockset trim generally includes an escutcheon, a cam, a slider, and an indicator mechanism. The cam is rotatably mounted in the escutcheon for rotation about a longitudinal axis between a first rotational position and a second rotational position. The slider is mounted in the escutcheon and engaged with the cam. The indicator mechanism is mounted in the escutcheon for movement between a first indicator state, in which a first indicium is visible via a window in the escutcheon, and a second indicator state, in which a second indicium is visible via the window. The indicator mechanism is engaged with the cam via the slider such that the indicator mechanism adopts the first indicator state in response to the cam adopting the first rotational position and adopts the second indicator state in response to the cam adopting the second rotational position. Further embodiments, forms, features, and aspects of the present application shall become apparent from the description and figures provided herewith.

DETAILED DESCRIPTION OF ILLUSTRATIVE EMBODIMENTS

Figure 1:
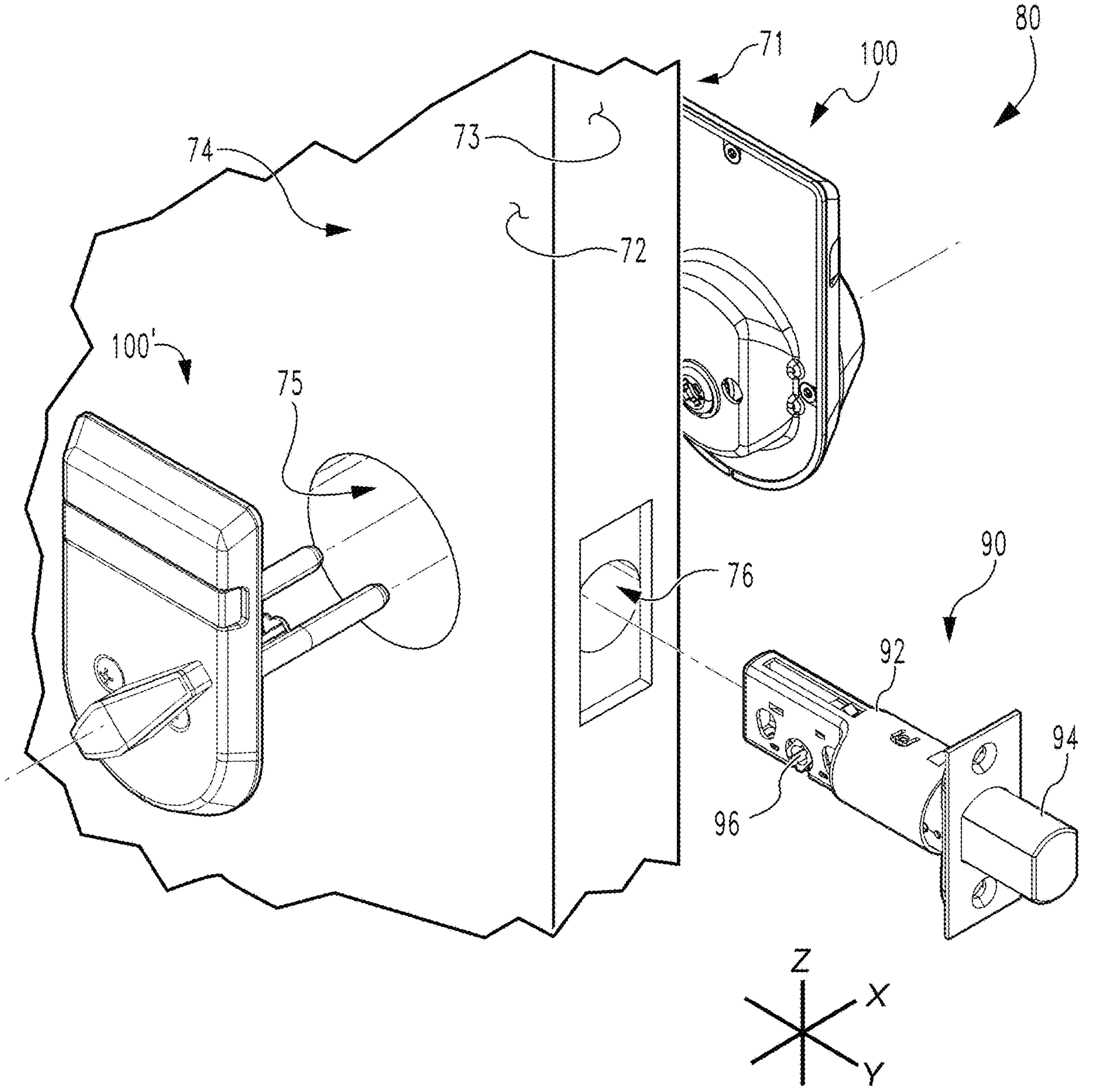
FIG. 1 is an exploded assembly view of a lockset according to certain embodiments installed to a door.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the terms "longitudinal," "lateral," and "transverse" may be used to denote motion or spacing along three mutually perpendicular axes, wherein each of the axes defines two opposite directions. In the coordinate system illustrated in FIG. 1, the X-axis defines the longitudinal directions, the Y-axis defines the lateral directions, and the Z-axis defines the transverse directions. These terms are used for case and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements that are described as being "laterally offset" from one another may also be offset in the longitudinal and/or transverse directions, or may be aligned in the longitudinal and/or transverse directions. Moreover, the term "transverse" may also be used to describe motion or spacing that is non-parallel to a particular axis or direction. For example, an element that is described as being "movable in a direction transverse to the longitudinal axis" may move in a direction that is perpendicular to the longitudinal axis and/or in a direction oblique to the longitudinal axis. The terms are therefore not to be construed as limiting the scope of the subject matter described herein to any particular arrangement unless specified to the contrary.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

With reference to FIG. 1, illustrated therein is a door 70 having a lockset 80 according to certain embodiments installed thereto. The door 70 has a non-egress side 71, an egress side 72 opposite the non-egress side 71, and a latch edge 73. The door 70 is provided with a standard door preparation 74, which includes a cross-bore 75 that extends between the non-egress side 71 and the egress side 72, and a latch bore 76 that extends from the latch edge 73 to the cross-bore 75. The lockset 80 generally includes a bolt mechanism 90 mounted in the latch bore 76, an outside trim 100 mounted to the non-egress side 91, and an inside trim 100' mounted to the egress side 92. As described herein, each of the trims 100, 100' is operable to actuate the bolt mechanism 90 to lock and unlock the lockset 80.

The lockset 80 has a first state and a second state, and includes at least one indicator operable to provide a visual indication regarding the current state of the lockset 80. In the illustrated form, one of the first state or the second state is a locked state, and the other of the first state and the second state is an unlocked state. It is also contemplated that the concepts described herein may be utilized to provide a visual indication regarding another set of states of the lockset 80.

The illustrated bolt mechanism 90 is provided in the form of a deadbolt mechanism, and generally includes a housing 92, a deadbolt 94 slidably mounted in the housing 92, and a retractor 96 rotatably mounted in the housing 92. The retractor 96 is engaged with the deadbolt 94 such that rotation of the retractor 96 drives the deadbolt 94 between its extended position and its retracted position. The retractor 96 has a first rotational position corresponding to a first linear position of the deadbolt 94 (e.g., one of the extended position or the retracted position), and a second rotational position corresponding to a second linear position of the deadbolt 94 (e.g., the other of the extended position or the retracted position).

In the illustrated embodiment, the lockset 80 is provided as a deadbolt lockset, in which the locked/unlocked state of the lockset 80 is defined by the extended/retracted position of the deadbolt 94. As such, the first state of the lockset 80 corresponds to the first position of the deadbolt 94, and the second state of the lockset 80 corresponds to the second position of the deadbolt 94. It is also contemplated that indicator mechanisms such as those described herein may be utilized to indicate states other than the locked/unlocked state, and that the locked/unlocked state may not necessarily correspond to the extended/retracted position of a deadbolt. For example, the locked/unlocked state may instead relate to the ability of an actuator to retract a spring-biased latchbolt.

Figure 2:
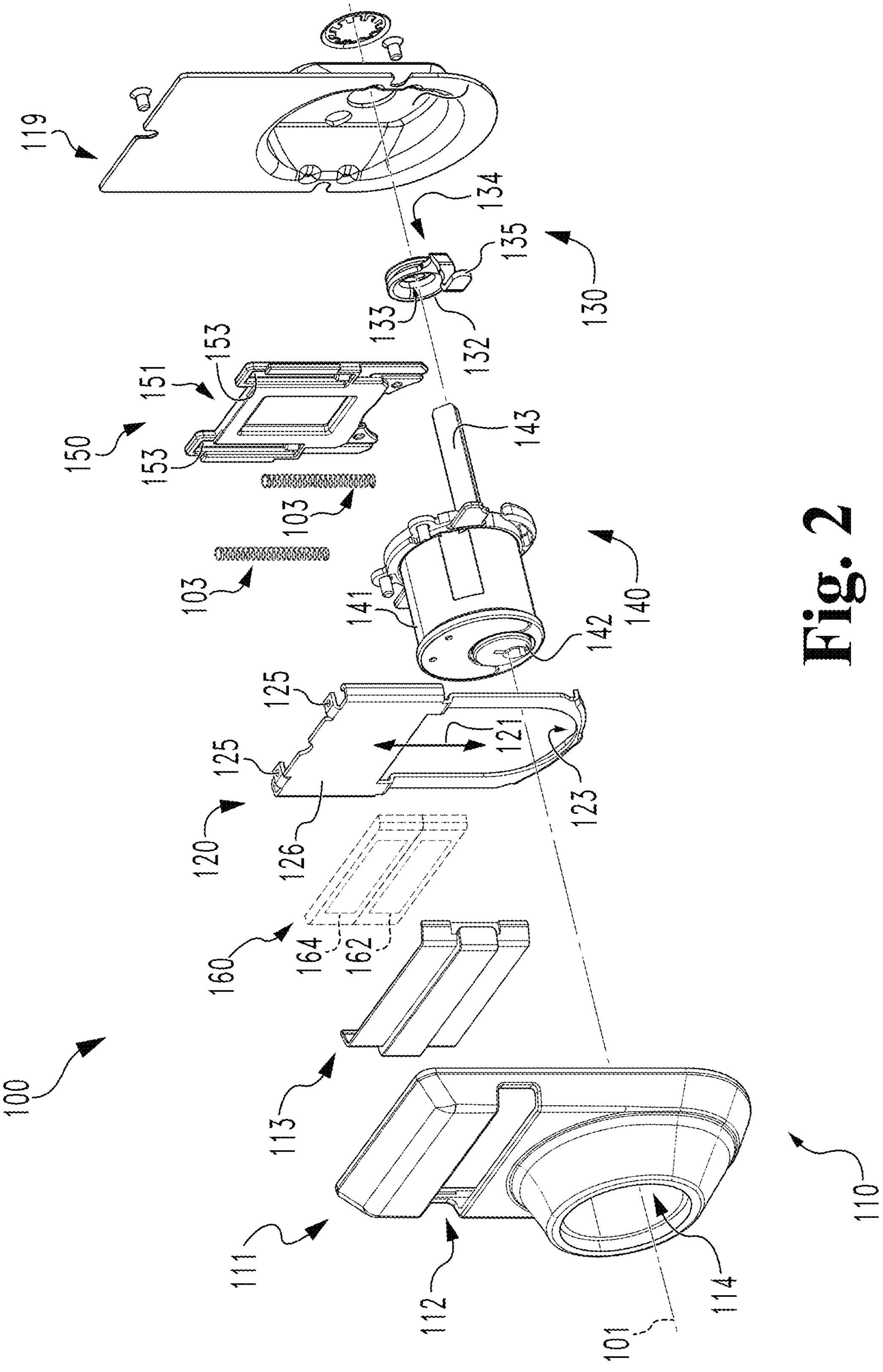
FIG. 2 is an exploded assembly view of an outside trim according to certain embodiments.

With additional reference to FIG. 2, the outside trim 100 generally includes a housing 110, a slider 120 slidably mounted in the housing 110, a cam 130 operable to move the slider 120, an actuator 140 operable to rotate the cam 130, a bias mechanism 150 biasing the slider 120 toward a home position, and an indicator mechanism 160 engaged with the slider 120. As described herein, the illustrated actuator 140 includes a tailpiece 143 that extends along a longitudinal axis 101 and engages the retractor 96 such that the tailpiece 143 is operable to extend and retract the deadbolt 94 to thereby change the state of the lockset 80. Moreover, this rotation of the tailpiece 143 causes rotation of the cam 140 between a first rotational position and a second rotational position, which in turn drives the slider 120 between a first linear position and a second linear position to thereby cause the indicator mechanism 160 to selectively and alternately display each of a first indicium 162 corresponding to the first state of the lockset 80 and a second indicium 164 corresponding to the second state of the lockset 80.

The illustrated housing 110 generally includes an escutcheon 111, and may further include a back plate 119 that encloses one or more of the working components of the trim 100 within the escutcheon 111. The illustrated escutcheon 111 includes a window 112 through which the indicia 162, 164 are selectively displayed, and an actuator seat 114 in which the actuator 140 is seated. In certain embodiments, a shield 113 may be mounted to the escutcheon 110 at the window 112 to thereby discourage tampering with the indicator mechanism 160. As will be appreciated, the shield 113 may be transparent or translucent such that the indicia 162, 164 are visible when aligned with the window 112.

The slider 120 is slidably mounted in the housing 110, and generally includes a cam surface 123 operable to engage the cam 130, one or more tabs 125 operable to engage the bias mechanism 150, and an engagement portion 126 operable to engage the indicator mechanism 160. The cam surface 123 is coupled with the engagement portion 126, for example via one or more arms 124 extending between and connecting the cam surface 123 and the engagement portion 126. The slider 120 is slidably mounted in the housing 110 for movement between a first linear position and a second linear position.

As described herein, the first linear position of the slider 120 corresponds to the first rotational position of the cam 130 and the first state of the lockset 80, and causes the indicator mechanism 160 to display the first indicium 162 via the window 112. Conversely, the second linear position of the slider 120 corresponds to the second rotational position of the cam 130 and the second state of the lockset 80, and causes the indicator mechanism 160 to display the second indicium 164 via the window 112.

The cam 130 is mounted for rotation within the housing 110, and is operable to be rotated by the actuator 140. In the illustrated form, the cam 130 includes a body portion 132 defining a slot 133 through which a tailpiece 143 of the actuator 140 extends such that the cam 130 is rotationally coupled with the tailpiece 143. The cam 130 also includes an arm 134 that extends from the body portion 132 at least partially in the longitudinal direction, and which includes a finger 135 that rides along the arcuate cam surface 123 during actuation of the trim 100 as described herein.

The finger 135 is engaged with the arcuate cam surface 123 via a one-way engagement 104 that permits the cam 130 to drive the slider 120 from the first slider position to the second slider position, while preventing the slider 120 from rotating the cam 130 between its first rotational position and its second rotational position. As such, if a user were to exert a tampering force 50 urging the slider 120 from its first position (FIG. 5) toward its second position (FIG. 7), such movement of the slider 120 would not cause a corresponding rotation of the cam 130. Since the cam 130 does not rotate to its second rotational position, the tailpiece 143 does not rotate in a manner that would cause the bolt 94 to extend or retract. Thus, the one-way engagement 104 may serve to prevent a tampering attack from successfully changing the locked/unlocked state of the lockset 80.

The illustrated actuator 140 is mounted in the actuator seat 114, and generally includes a shell 141, a plug 142 rotatably mounted in the shell 141, and a tailpiece 143 operable to be rotated by the plug 142. In the illustrated form, the actuator 140 is provided in the form of a lock cylinder that further includes a tumbler assembly operable to selectively prevent rotation of the plug 142. As will be appreciated, when an appropriate key is inserted to the plug 142 of a lock cylinder, the key moves the tumbler assembly to an unblocking state to thereby permit rotation of the plug 142. It is also contemplated that the actuator 140 may be provided in the form of an emergency override, in which the plug is freely rotatable relative to the shell. For example, the plug of the emergency override may include a slot configured to receive an edge of a coin or other tool to thereby facilitate rotation of the plug relative to the shell.

As will be appreciated, the actuator 140 is operable to transition the lockset 80 between its first state and its second state. In the illustrated form, the tailpiece 143 engages the retractor 96 of the deadbolt mechanism 90 such that rotation of the plug 142 causes a corresponding movement of the deadbolt 94, thereby locking and unlocking the lockset 80. It is also contemplated that the actuator 140 may instead move another component to transition the lockset 80 between its first state and its second state.

The bias mechanism 150 is mounted in the escutcheon 110 adjacent the slider 120, and in the illustrated form includes an anchor base 151 and a pair of springs 103. The anchor base 151 includes a pair of channels 153 in which springs 103 are seated. Each of the slider tabs 123 extends into a corresponding one of the channels 153 to thereby engage the corresponding spring 103 while limiting the slider 120 to movement along a slider axis 121 that extends transverse to the longitudinal rotational axis 101 (e.g., in a vertical direction). The bias mechanism 150 biases the slider 120 toward its first linear position, thereby biasing the indicator mechanism 160 to a first indicator state.

The indicator mechanism 160 is configured to selectively and alternately display each of a first indicium 162 and a second indicium 164 based upon the position of the slider 120. The first indicium 162 pertains to the first state of the lockset 80 (e.g., one of a locked state or an unlocked state), and is displayed when the indicator mechanism 160 is in a first indicator state, for example as a result of the slider 120 adopting its first linear position. Similarly, the second indicium 164 pertains to the second state of the lockset 80 (e.g., the other of the locked state or the unlocked state), and is displayed when the indicator mechanism 160 is in a second indicator state, for example as a result of the slider 120 adopting its second linear position. In various forms, one or both of the indicia 162, 164 may include one or more of a color, a symbol, a word, one or more alphanumeric characters, and/or another form of indicium.

In FIG. 2, the indicator mechanism 160 is illustrated schematically. In certain embodiments, the indicator mechanism 160 may be provided along the lines of the sliding track-based indicator mechanism 260 illustrated in FIGS. 8-11. In certain embodiments, the indicator mechanism 160 may be provided along the lines of the rotating barrel indicator mechanism 360 illustrated in FIGS. 12-15. In certain embodiments, the indicator mechanism 160 may be provided along the lines of the pivoting indicator mechanism 460 illustrated in FIGS. 16-18. In certain embodiments, the indicator mechanism 160 may be provided along the lines of the split indicator mechanism 560 illustrated in FIGS. 19 and 20.

Figure 4:
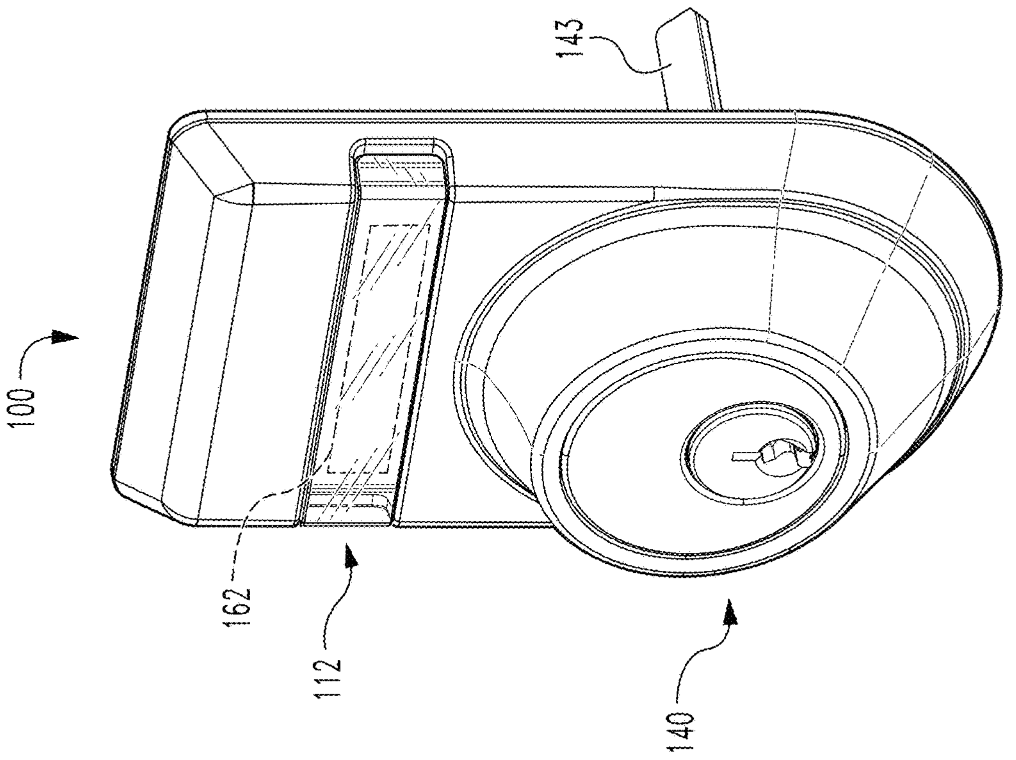
FIG. 4 is a front perspective view of the outside trim in the first state.
Figure 6:
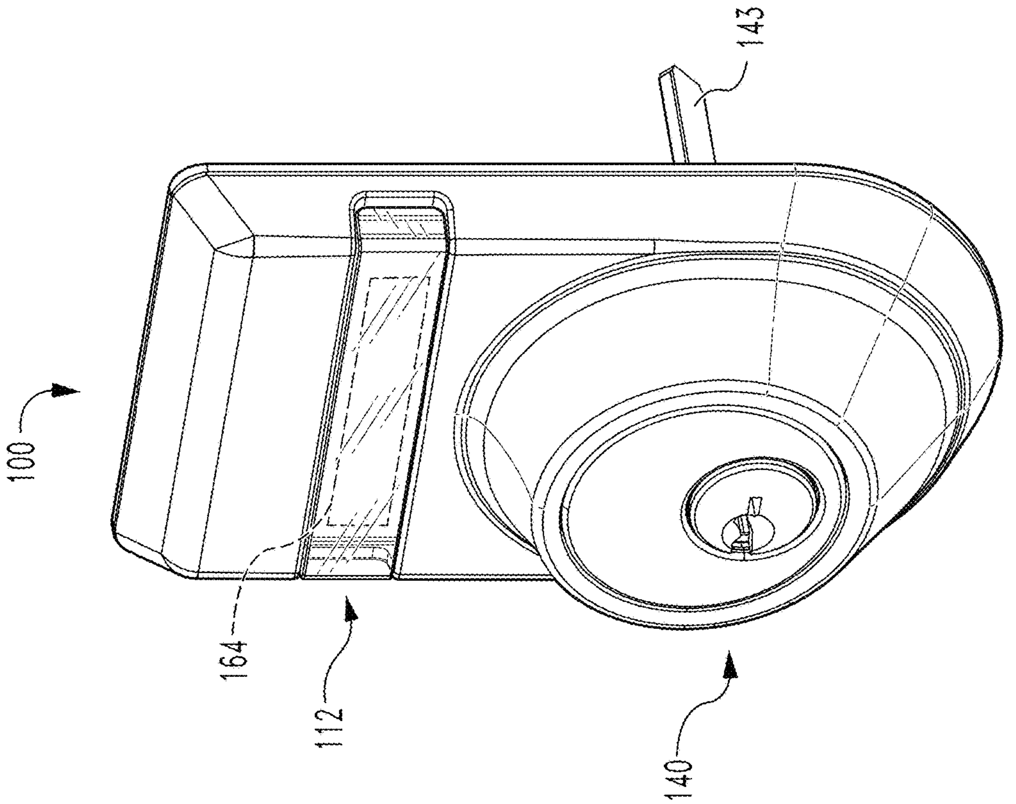
FIG. 6 is a front perspective view of the outside trim in the second state.
Figure 5:
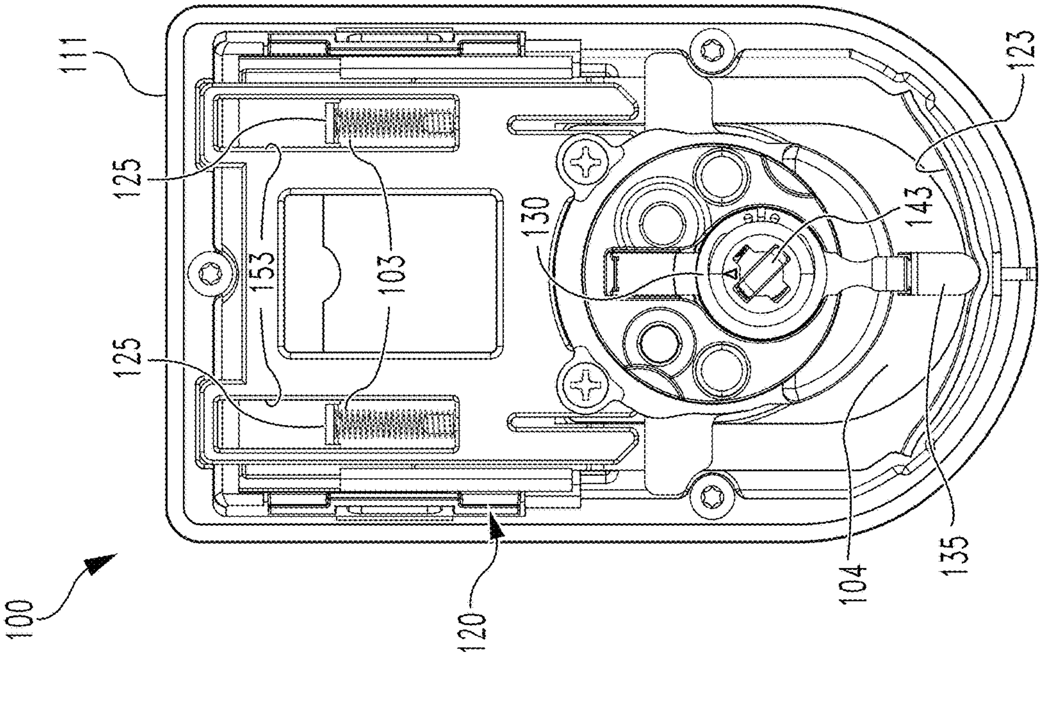
FIG. 5 is a rear plan view of the outside trim in a second state.

With additional reference to FIGS. 3-6, illustrated therein is the trim 100 in its first state (FIGS. 3 and 4) and its second state (FIGS. 5 and 6). In the illustrated form, the first state (FIGS. 3 and 4) corresponds to the locked state of the lockset 80, and the second state (FIGS. 5 and 6) corresponds to the unlocked state of the lockset 80. It is also contemplated that this arrangement may be reversed such that the first state corresponds to the unlocked state and the second state corresponds to the locked state.

Figure 3:
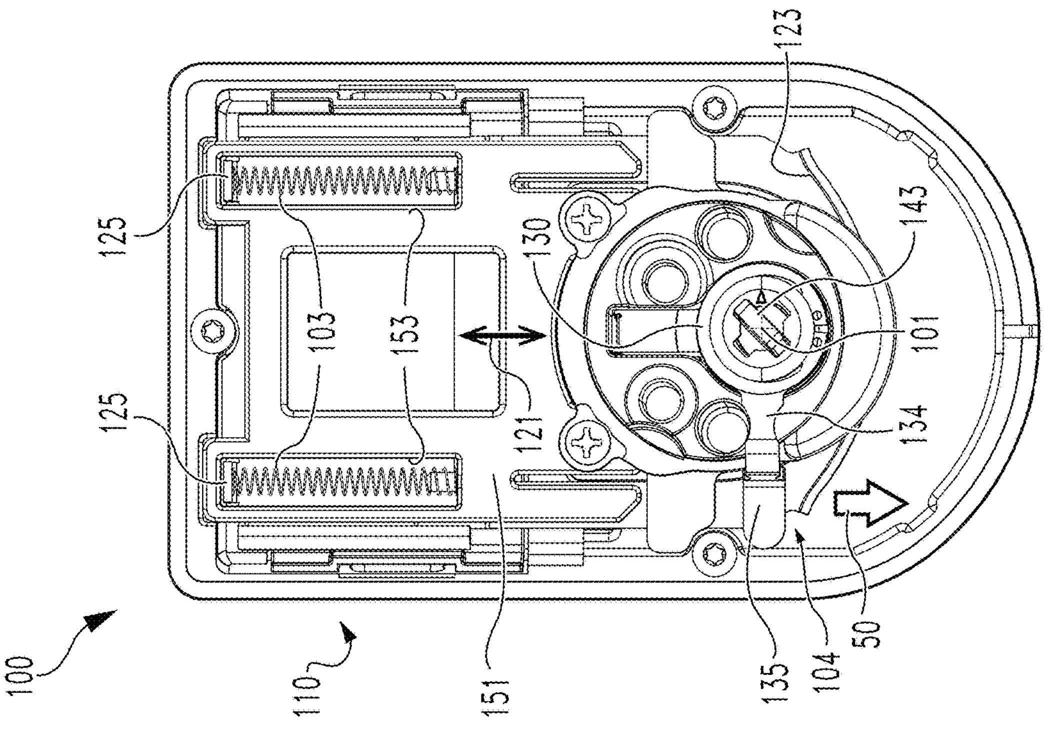
FIG. 3 is a rear plan view of the outside trim in a first state.

FIGS. 3 and 4 illustrate the trim 100 in its first state, in which the slider 120 is in its first linear position, the cam 130 is in its first rotational position, and the indicator mechanism 160 is in the first indicator state. With the trim 100 in this first state, the arm 134 of the cam 130 is off to one side of the arcuate cam surface 123, and thereby permits the slider 120 to adopt its first linear position under the biasing force of the bias mechanism 150. With the indicator mechanism 160 in the first indicator state, the first indicium 162 is visible via the window 112.

FIGS. 5 and 6 illustrate the trim 100 in its second state, in which the slider 120 is in its second linear position, the cam 130 is in its second rotational position, and the indicator mechanism 160 is in the second indicator state. With the trim 100 in this second state, the arm 134 points downward, and the finger 135 is engaged with the cam surface 123 to thereby retain the slider 120 in its second linear position against the biasing force of the springs 103. With the indicator mechanism 160 in the second indicator state, the second indicium 164 is visible via the window 112.

Figure 7:
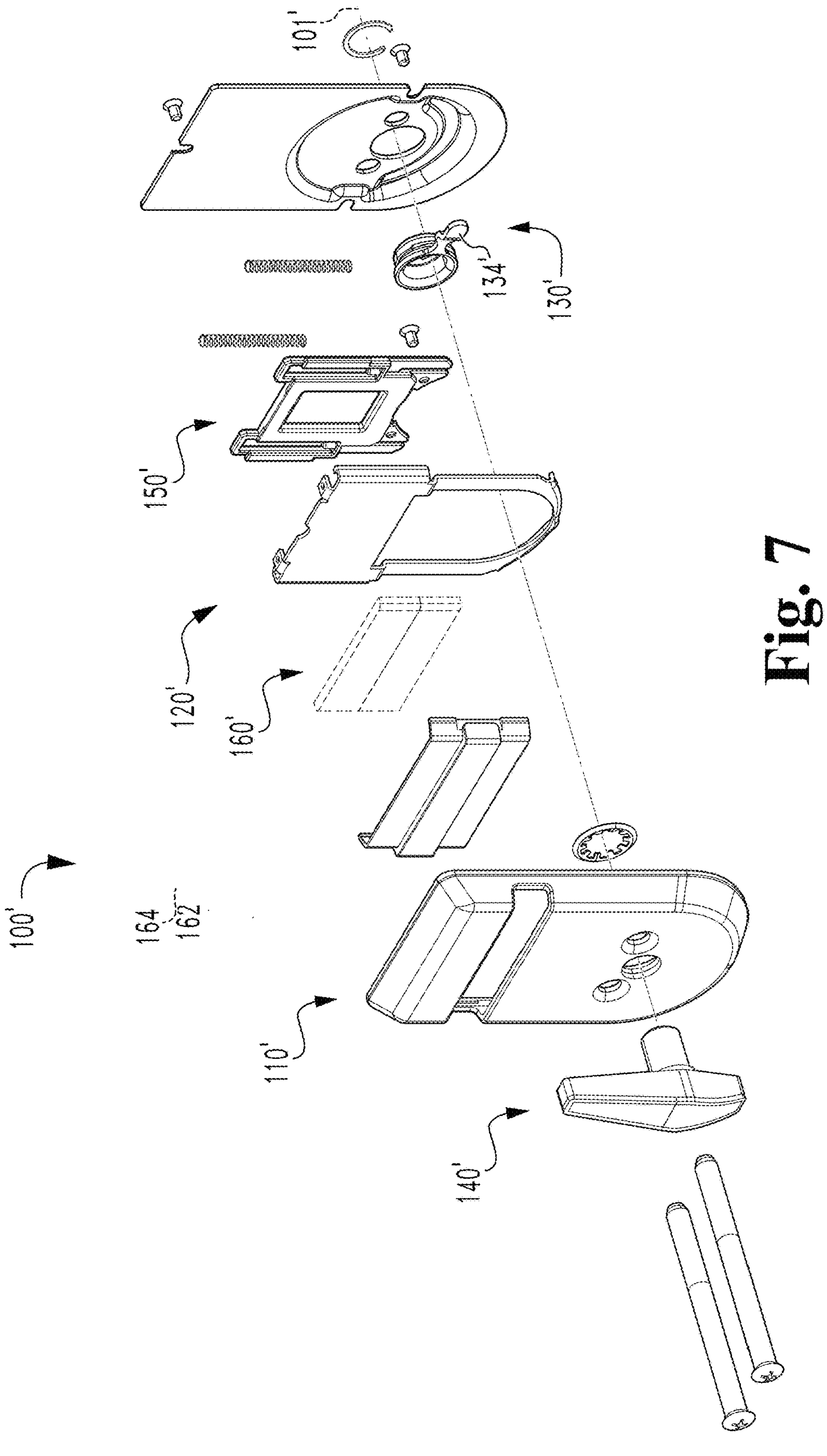
FIG. 7 is an exploded assembly view of an inside trim according to certain embodiments.

With additional reference to FIG. 7, the inside trim 100' is substantially similar to the outside trim 100, and similar reference characters are used to indicate similar elements and features. For example, the inside trim 100' generally includes a housing 110', a slider 120', a bias mechanism 150', and an indicator mechanism 160', which may be substantially similar to the above-described housing 110, slider 120, bias mechanism 150, and indicator mechanism 160, respectively. The inside trim 100' also includes a cam 130' corresponding to the above-described cam 130, and an actuator 140' operable to rotate the cam 130'. In the interest of conciseness, the following description of the inside trim 100' focuses primarily on features that are different from those described above with reference to the outside trim 100.

In contrast to the outside trim 100, in which the actuator 140 is provided in the form of a lock cylinder or an override mechanism, the actuator 140' of the inside trim 100' may be provided in a form that facilitates manual manipulation of the locked/unlocked state of the trim 200. For example, the actuator of the illustrated inside trim 100' may be provided in the form of a thumb turn 140', which may be rotationally coupled with the tailpiece 143 of the outside trim 100 to thereby permit manual adjustment of the locked/unlocked state of the lockset 80 via the thumb turn 140'.

Moreover, the cam 130' of the inside trim 100' may be slightly different from the cam 130 of the outside trim 100. For example, the arm 134' of the illustrated cam 130 extends radially, but does not necessarily extend in the longitudinal direction of the rotational axis 101'. Regardless of the precise configuration of the cams 130, 130', the inside cam 130' may interact with the indicator mechanism 160' in a manner substantially similar to that described above in order to transition the inside trim 100' between its first state and its second state.

In FIG. 7, the indicator mechanism 160' is illustrated schematically. In certain embodiments, the indicator mechanism 160' may be provided along the lines of the sliding track-based indicator mechanism 260 illustrated in FIGS. 8-11. In certain embodiments, the indicator mechanism 160' may be provided along the lines of the rotating barrel indicator mechanism 360 illustrated in FIGS. 12-15. In certain embodiments, the indicator mechanism 160' may be provided along the lines of the pivoting indicator mechanism 460 illustrated in FIGS. 16-18. In certain embodiments, the indicator mechanism 160' may be provided along the lines of the split indicator mechanism 560 illustrated in FIGS. 19 and 20.

Figure 8:
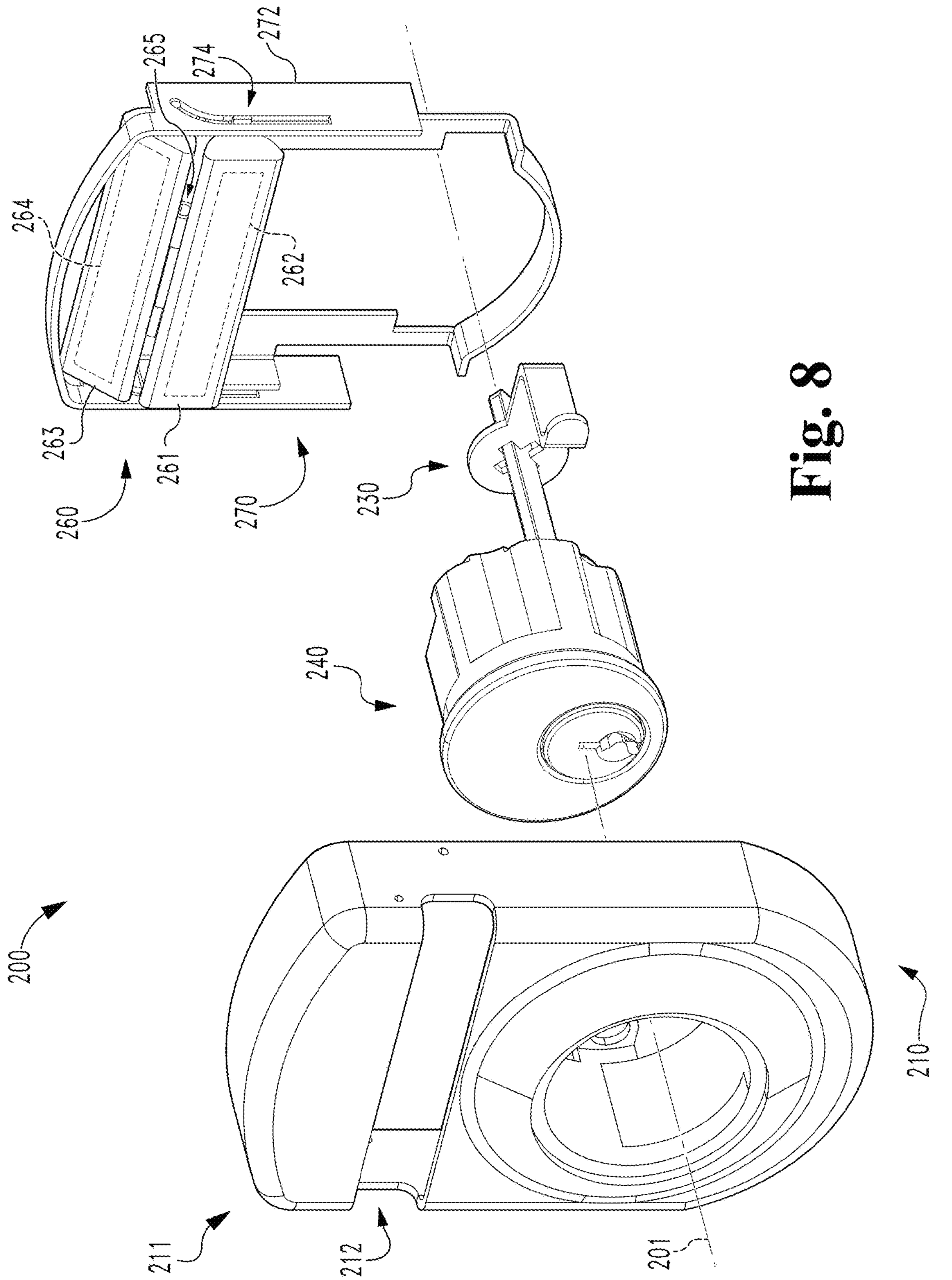
FIG. 8 is an exploded assembly view of a trim including a sliding indicator mechanism according to certain embodiments.

With additional reference to FIG. 8, illustrated therein is a trim 200 according to certain embodiments. The trim 200 is an embodiment of the above-described trim 100, and generally includes a housing 210, a slider 220, a cam 230, and an actuator 240, which respectively correspond to the housing 110, slider 120, cam 130, and actuator 140 described above. While not specifically illustrated, the trim 200 may further include a bias mechanism along the lines of the bias mechanism 150. Moreover, while the actuator 240 of the illustrated trim 200 is provided in the form of a lock cylinder, it should be appreciated that the actuator 240 may instead be provided in another form, such as that of a thumbturn or an emergency override. As described herein, the trim 200 further includes an indicator mechanism 260, which is an embodiment of the above-described indicator mechanism 160, and a guide bracket 270 configured to guide movement of the indicator mechanism 260 between a first indicator state and a second indicator state. In the interest of conciseness, the following description of the trim 200 focuses primarily on features that are different from those described above with reference to the trim 100.

Figure 9:
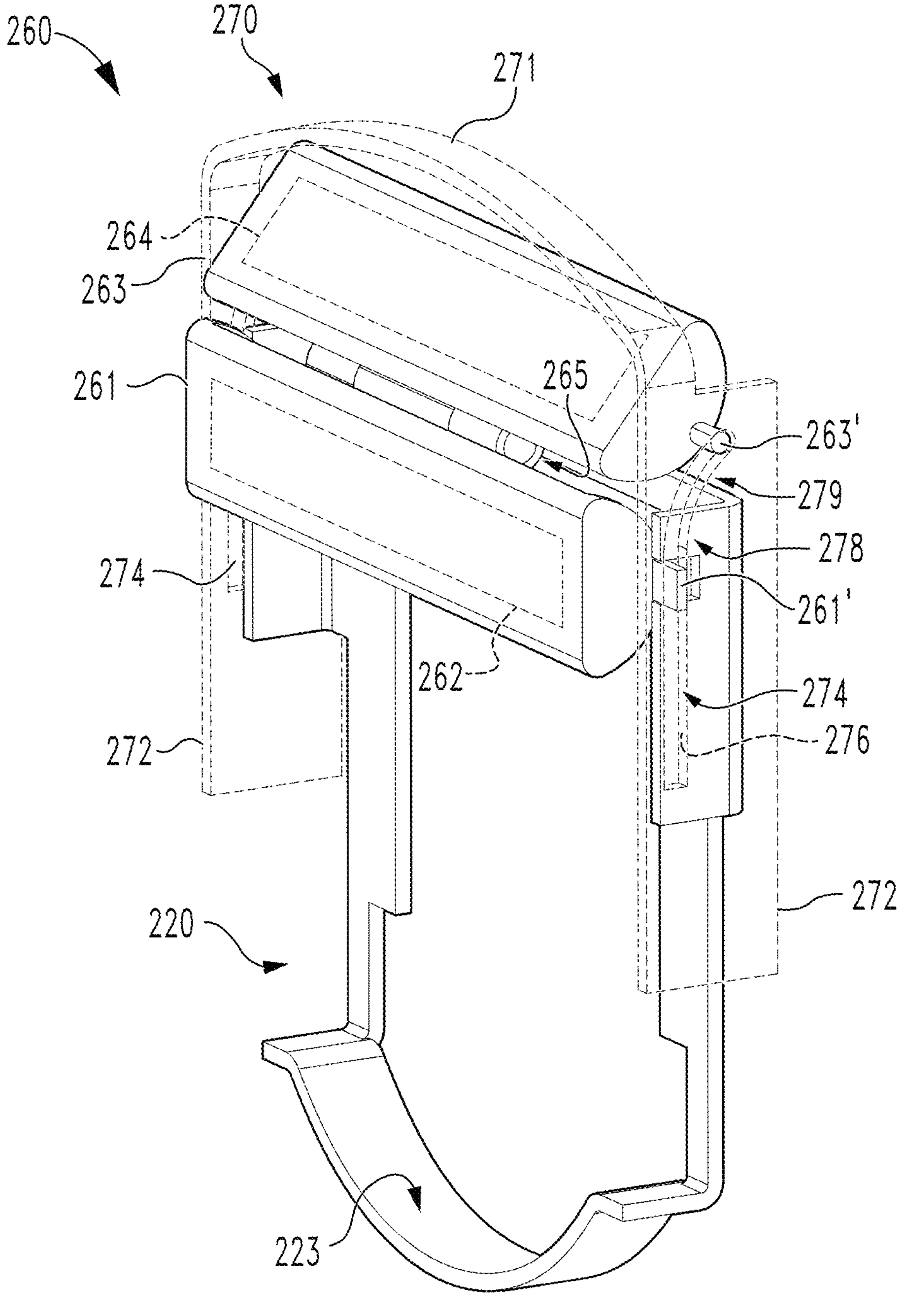
FIG. 9 is a perspective view of a portion of the trim illustrated in FIG. 8.

With additional reference to FIG. 9, the illustrated indicator mechanism 260 generally includes a first sign 261, a second sign 263, and a hinge 265 pivotably connecting the first sign 261 and the second sign 263. The first sign 261 includes a first indicium 262, and the second sign 263 includes a second indicium 264. The indicia 262, 264 may, for example, take the form(s) described above with reference to the indicia 162, 164. As described herein, the first sign 261 may include a first guide post 261', the second sign 263 may include a second guide post 263', and each of the guide posts 261', 263' may interface with a guide track 274 to facilitate movement of the panels 261, 263 as the indicator mechanism 260 moves between its first indicator state and its second indicator state.

As with the above-described embodiment, the slider 220 is engaged with the indicator mechanism 260 such that the slider 220 is operable to move the indicator mechanism 260 between the first indicator state and the second indicator state. In the illustrated form, the first sign 261 is coupled to the slider 220 for joint sliding movement with the slider 220. For example, a portion of the first post 261' may be seated in a notch 226, which may be considered to define an engagement portion of the slider 220. It is also contemplated that the slider 220 may be coupled with the first sign 261 in another manner, and/or that the slider 220 and the first sign 261 may be defined by a single-piece monolithic structure.

The guide bracket 270 is mounted in the housing 210, and in certain embodiments may be considered to constitute a portion of the housing 210. The guide bracket 270 includes a guide plate 272 that includes a guide track 274, which interfaces with the indicator mechanism 260 to facilitate movement of the panels 261, 263 as the indicator mechanism 260 moves between its first indicator state and its second indicator state. For example, in the illustrated form, the guide track 274 is provided in the form of a slot 275 that receives each of the guide posts 261', 263' to thereby guide the indicator mechanism 260 for movement between its first indicator state and its second indicator state. In the illustrated form, each guide track 274 generally includes a first track segment 276, which may be relatively straight, and a second track segment 278, which defines a jog 279 that bends and/or curves away from the direction along which the first track segment 276 extends.

In the illustrated embodiment, both the first guide post 261' and the second guide post 263' engage the same guide track 274. It is also contemplated that the guide bracket 270 may include a first track that interfaces with the first guide post 261' and a second track that interfaces with the second guide post 263'. Moreover, while the illustrated guide bracket 270 includes two guide plates 272 that are connected by a connecting portion 271, it should be appreciated that a single guide track 274 may be utilized in certain embodiments.

Figure 10:
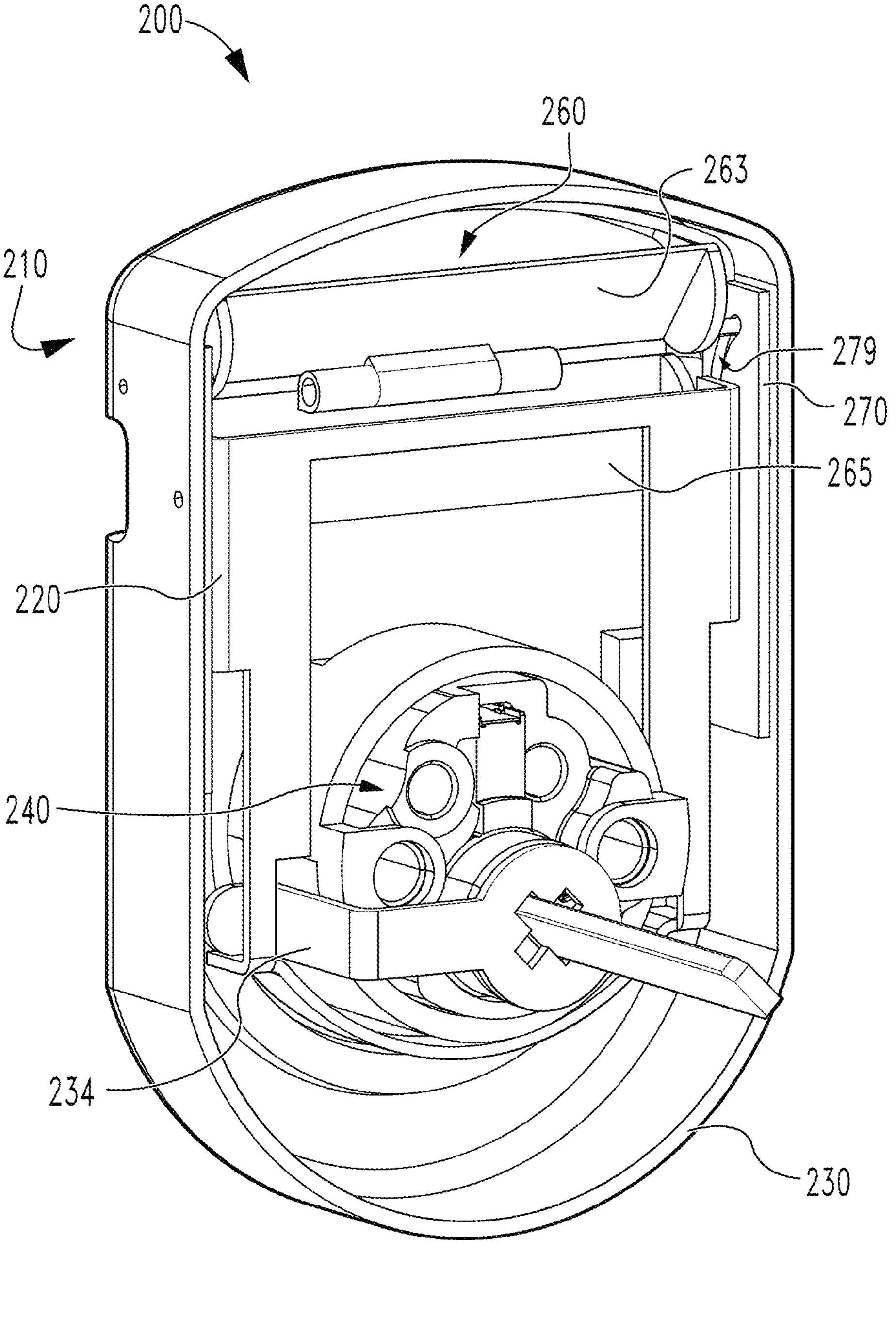
FIG. 10 is a rear perspective view of the trim illustrated in FIG. 8 in a first state.
Figure 11:
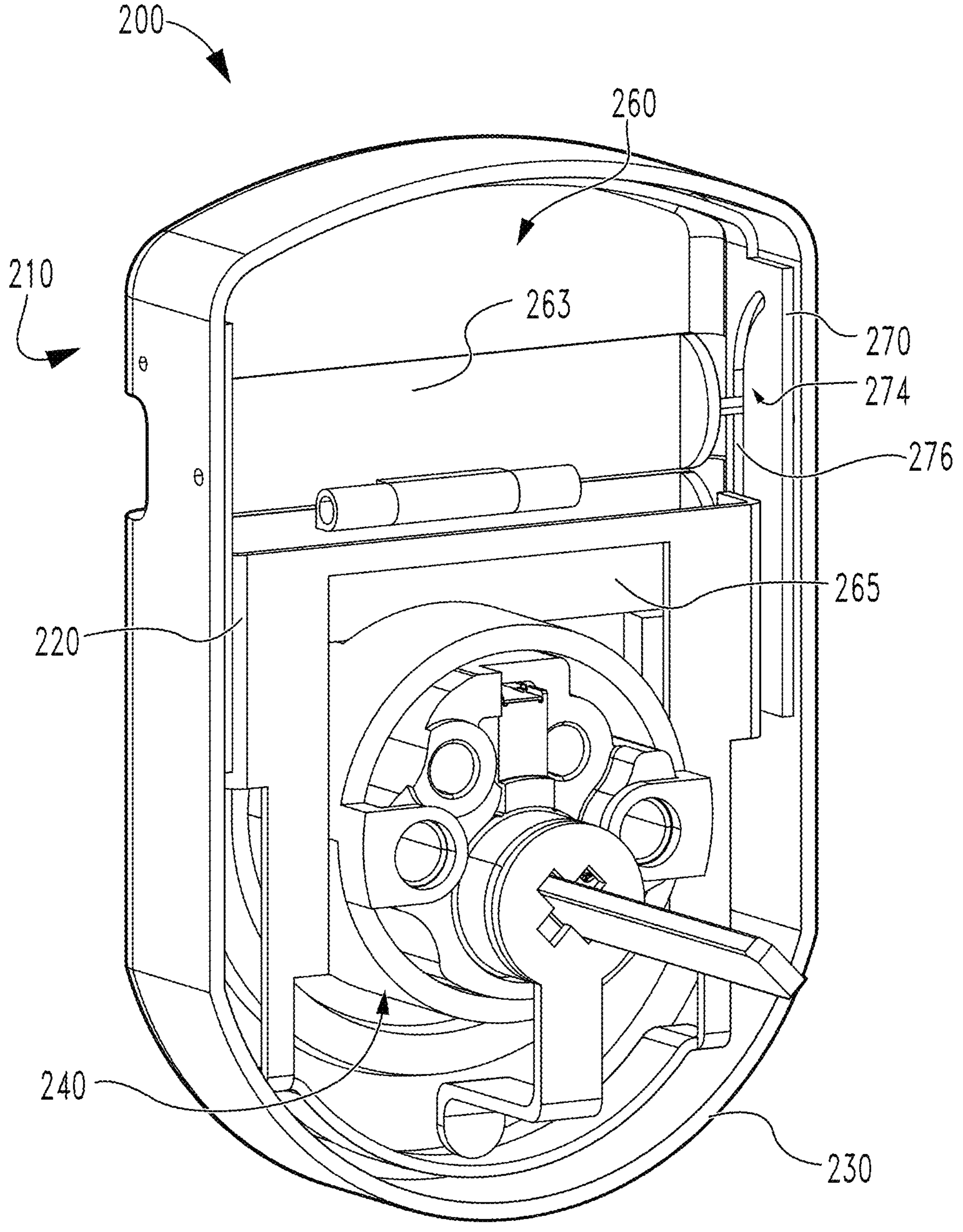
FIG. 11 is a rear perspective view of the trim illustrated in FIG. 8 in a second state.
Figure 12:
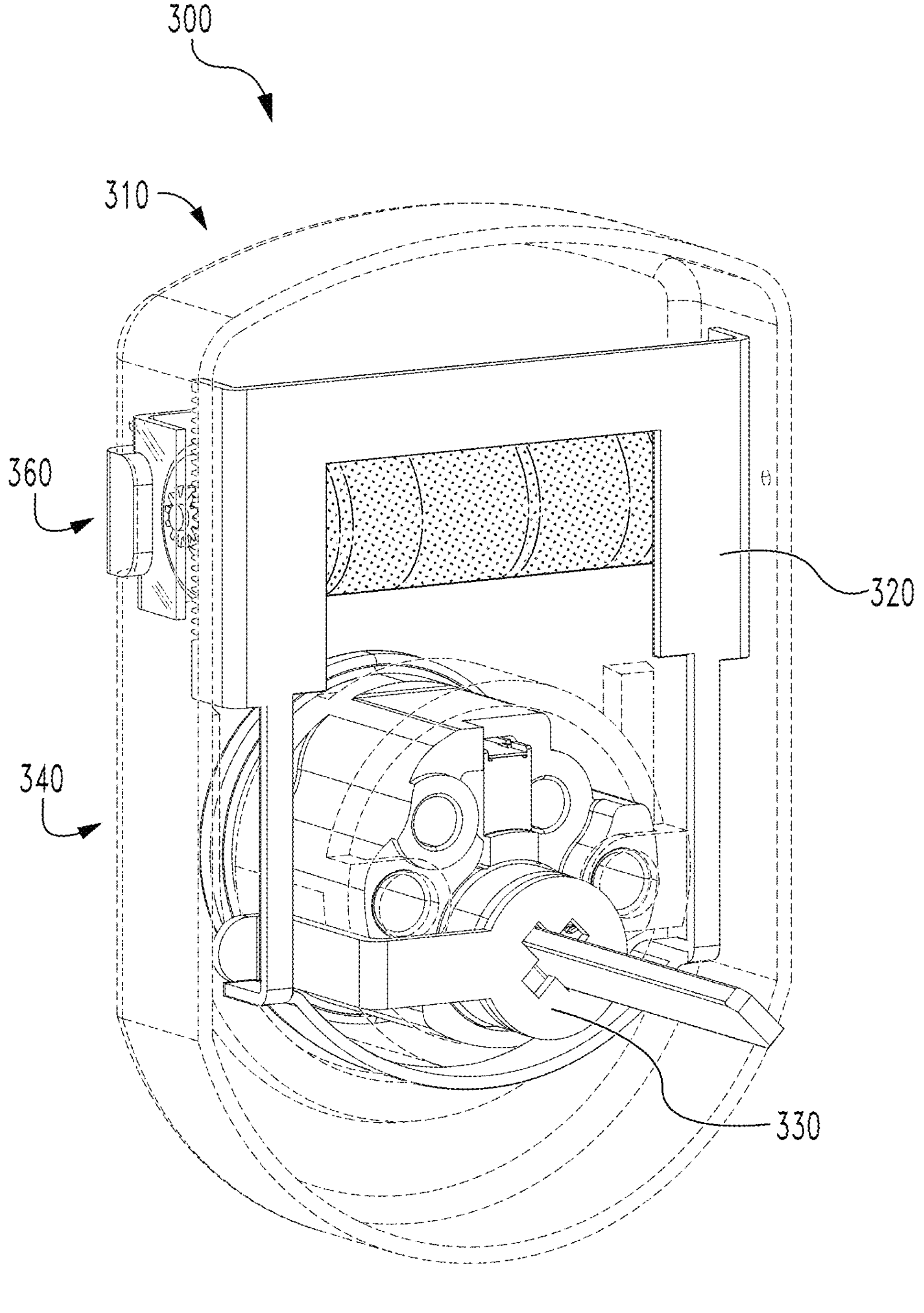
FIG. 12 is a rear perspective view of a trim including a rotating indicator mechanism according to certain embodiments, and illustrates the trim in a first state.

With additional reference to FIGS. 10 and 11, illustrated therein is the trim 200 in its first state (FIG. 10) and its second state (FIG. 11). In the first state (FIG. 10), the slider 220 is in its first linear position, the cam 230 is in its first rotational position, and the indicator mechanism 260 is in the first indicator state, in which the first sign 261 is aligned with the window 212 such that the first indicium 262 is visible to the user. In the second state (FIG. 11), the slider 220 is in its second linear position, the cam 230 is in its second rotational position, and the indicator mechanism 260 is in the second indicator state, in which the second sign 263 is aligned with the window 212 such that the second indicium 264 is visible to the user.

With the trim 200 in its first state (FIG. 10), the first sign 261 is aligned with the window 212, and the first guide post 261' is received in the first track segment 276. Additionally, the second sign 263 is angled away from the plane defined by the front surface of the first sign 261. Such an angled orientation may be achieved as a result of the configuration of the second track segment 278, which interfaces with the post 263' of the second sign 263. For example, the jog 279 may be configured to pivot the second sign 263 rearward (i.e., away from the user and toward the door) as the indicator mechanism 260 moves from the second indicator state (FIG. 11) to the first indicator state (FIG. 10).

As will be appreciated, the trim 200 may transition from its first state (FIG. 10) to its second state (FIG. 11) as a result of a user's actuation of the actuator 240. Such actuation causes the cam 230 to rotate from its first rotational position to its second rotational position, thereby driving the slider 220 from its first linear position to its second linear position. As the slider 220 moves from its first linear position to its second linear position, the first sign 261 is carried with the slider 220 such that the indicator mechanism 260 moves from the first indicator state to the second indicator state.

As the trim 200 transitions from its first state (FIG. 10) to its second state (FIG. 11), the first guide post 261' travels along the first track segment 276 such that the first sign 261 moves in a generally downward direction. This generally downward movement of the first sign 261 causes a corresponding generally downward movement of the second sign 263, thereby causing the second guide post 263' to travel along the guide track 274. As the second sign 263 moves from its first position to its second position, the jog 279 guides the second guide post 263' along an angled and/or curved path to thereby cause movement (e.g., pivotal movement and/or linear movement) of the second sign 263. As the second sign 263 approaches its second position (corresponding to the second indicator state of the indicator mechanism 260), the second guide post 263' exits the second track segment 278 and enters the first track segment 276 to thereby straighten the second sign 263 to the appropriate orientation.

With the trim 200 in its second state (FIG. 11), the second sign 263 is aligned with the window 212, and the second guide post 261' is received in the first track segment 276. The first guide post 263' may also be received in the first track segment 276.

As will be appreciated, the trim 200 may transition from its second state (FIG. 11) to its first state (FIG. 10) as a result of a user's actuation of the actuator 240. Such actuation causes the cam 230 to rotate from its second rotational position to its first rotational position, thereby driving the slider 220 from its second linear position to its first linear position. As the slider 220 moves from its second linear position to its first linear position, the first sign 261 is carried with the slider 220 such that the indicator mechanism 260 moves from the second indicator state to the first indicator state.

As the trim 200 transitions from its second state (FIG. 11) to its first state (FIG. 10), the first guide post 261' travels along the first track segment 276 such that the first sign 261 moves in a generally upward direction. This generally upward movement of the first sign 261 causes a corresponding generally upward movement of the second sign 263, thereby causing the second guide post 263' to travel along the guide track 274. As the second sign 263 moves from its second position to its first position, the jog 279 guides the second guide post 263' along an angled and/or curved path to thereby cause movement (e.g., pivotal movement and/or linear movement) of the second sign 263 toward its first position.

With additional reference to FIGS. 12-15, illustrated therein is a trim 300 according to certain embodiments. The trim 300 is an embodiment of the above-described trim 100, and generally includes a housing 310, a slider 320, a cam 330, and an actuator 340, which respectively correspond to the housing 110, slider 120, cam 130, and actuator 140 described above. While not specifically illustrated, the trim 300 may further include a bias mechanism along the lines of the bias mechanism 150. Moreover, while the actuator 340 of the illustrated trim 300 is provided in the form of a lock cylinder, it should be appreciated that the actuator 340 may instead be provided in another form, such as that of a thumbturn or an emergency override. As described herein, the trim 300 further includes an indicator mechanism 360, which is an embodiment of the above-described indicator mechanism 160. In the interest of conciseness, the following description of the trim 300 focuses primarily on features that are different from those described above with reference to the trim 100.

In the illustrated form, the indicator mechanism 360 is provided in the form of a cylinder or barrel 361, which includes a first indicium 362 relating to a first lockset state and a second indicium 364 relating to a second lockset state. The indicator mechanism 360 further comprises an interface portion 366, which is rotationally coupled with the barrel 361 and engages an engagement portion 326 of the slider 320. In the illustrated form, the interface portion 366 comprises a pinion 367 including pinion teeth, the engagement portion 326 comprises a rack 327 including rack teeth, and the rack 327 engages the pinion 367 to thereby define a rack and pinion arrangement 302. While the illustrated arrangement utilizes gear teeth that mesh with one another, it also contemplated that the gear teeth may be omitted. For example, the engagement portion 326 and the interface portion 366 may instead rely upon frictional engagement to rotate the barrel 361 in response to linear movement of the slider 320.

Figure 13:
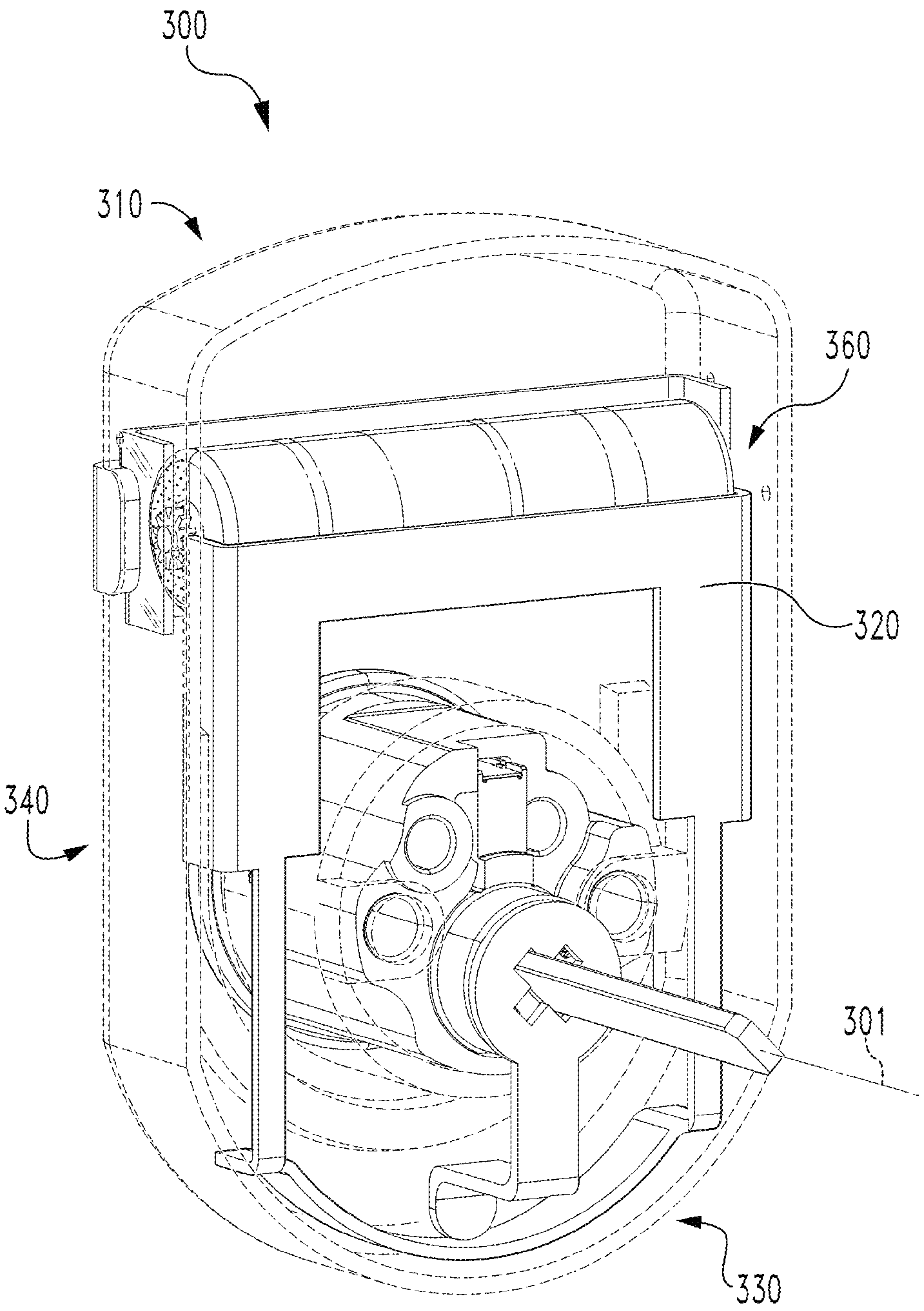
FIG. 13 is a rear perspective view of the trim illustrated in FIG. 12 in a second state.
Figure 15:
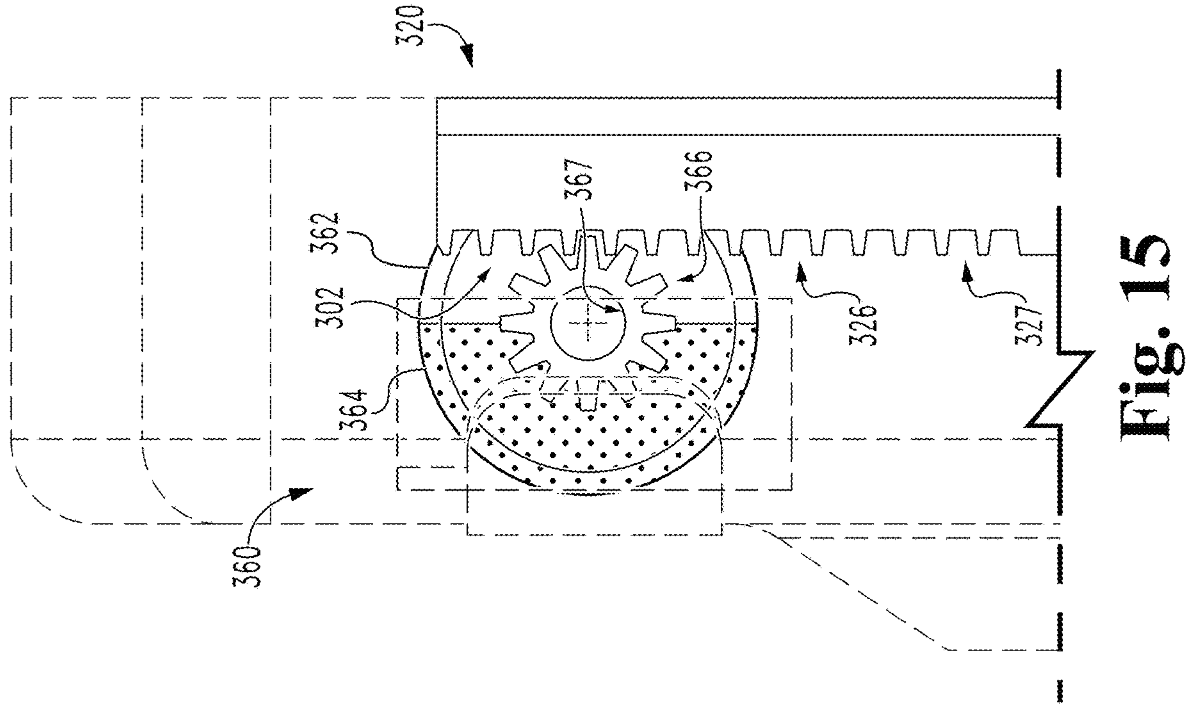
FIG. 15 is a side view of a portion of the trim illustrated in FIG. 12 in the second state.
Figure 14:
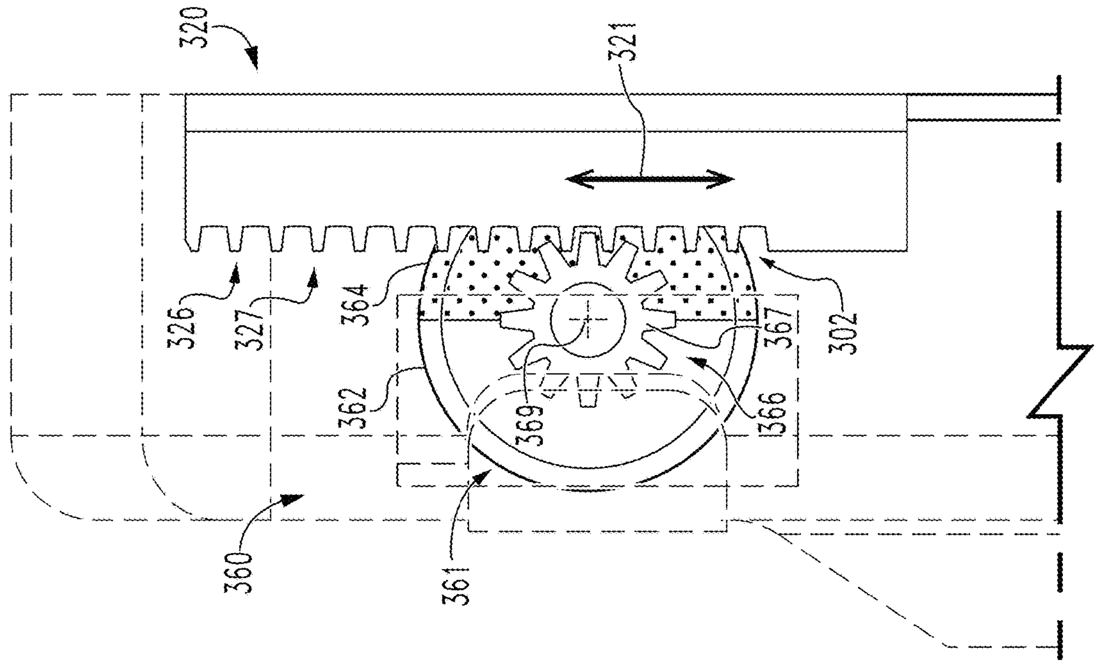
FIG. 14 is a side view of a portion of the trim illustrated in FIG. 12 in the first state.

The rack and pinion arrangement 302 (or alternatively, a similar arrangement lacking gear teeth) is configured to cause the indicator mechanism 360 to adopt a first indicator state in response to the slider 320 being located in its first linear position (FIGS. 12 and 14), and to cause the indicator mechanism 360 to adopt a second indicator state in response to the slider 320 being located in its second linear position (FIGS. 13 and 15). More particularly, the rack and pinion arrangement 302 is configured to rotate the barrel 361 about an indicator rotational axis 369 between a first orientation and a second orientation in response to linear movement of the slider 320 along a sliding axis 321. In the illustrated form, the indicator rotational axis 369 extends transverse to both the longitudinal axis 301 about which the cam 330 rotates and the sliding axis 321 along which the slider 320 moves.

Figure 16:
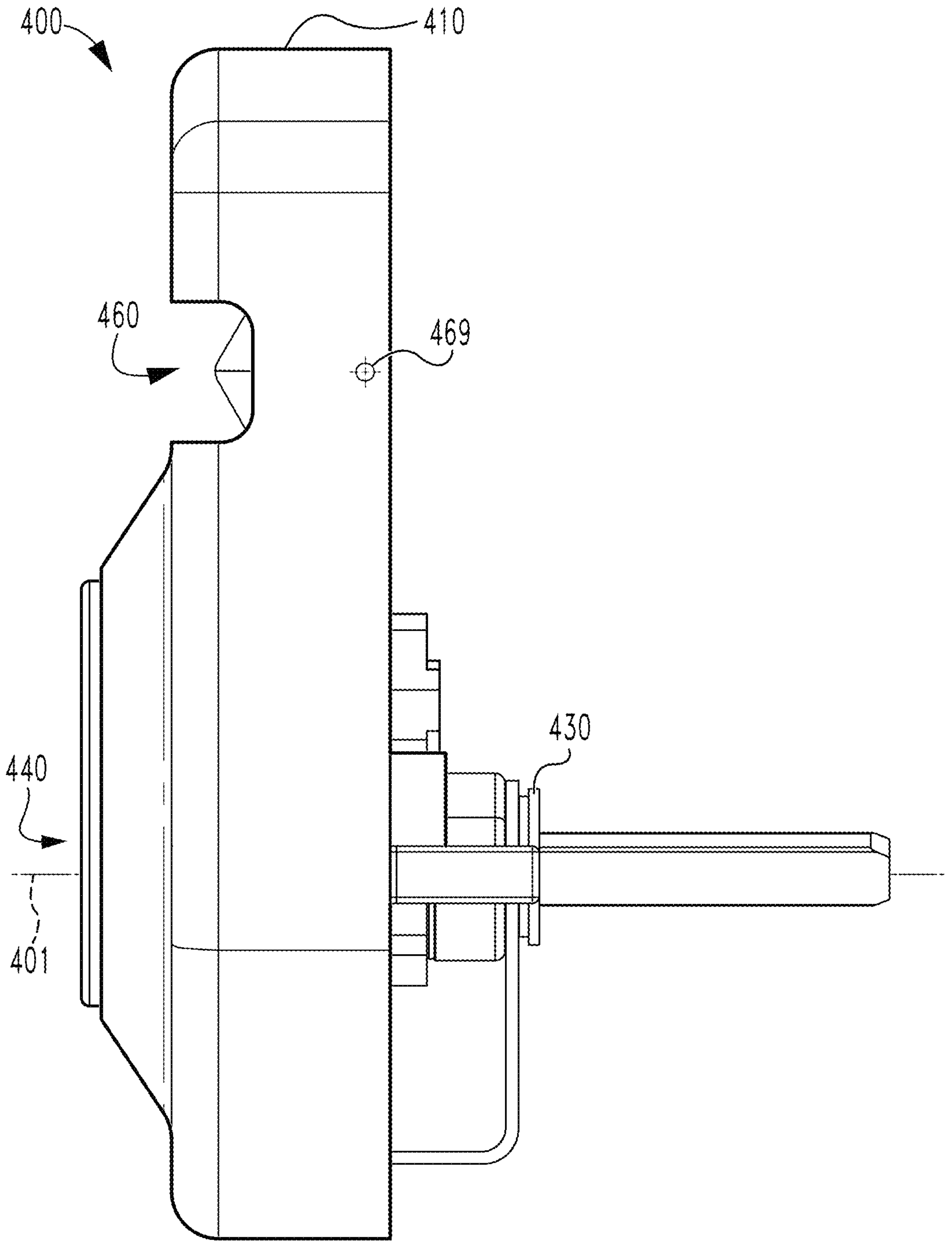
FIG. 16 is a side view of a trim including a pivoting indicator mechanism according to certain embodiments.
Figure 18:
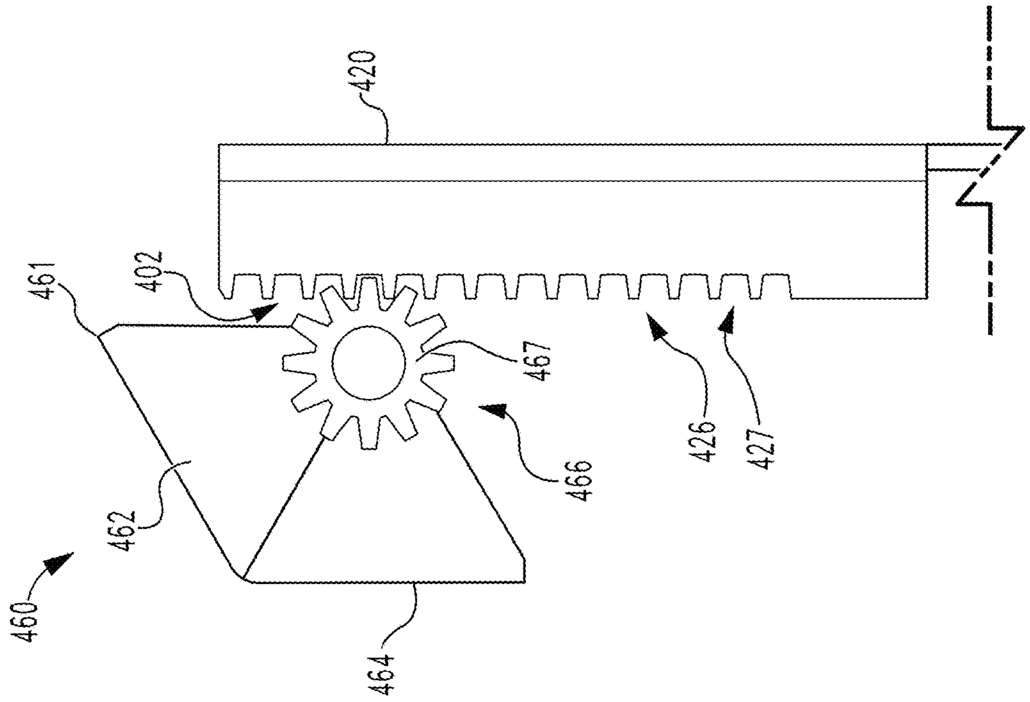
FIG. 18 is a side view of a portion of the trim illustrated in FIG. 16 when the trim is in a second state.
Figure 17:
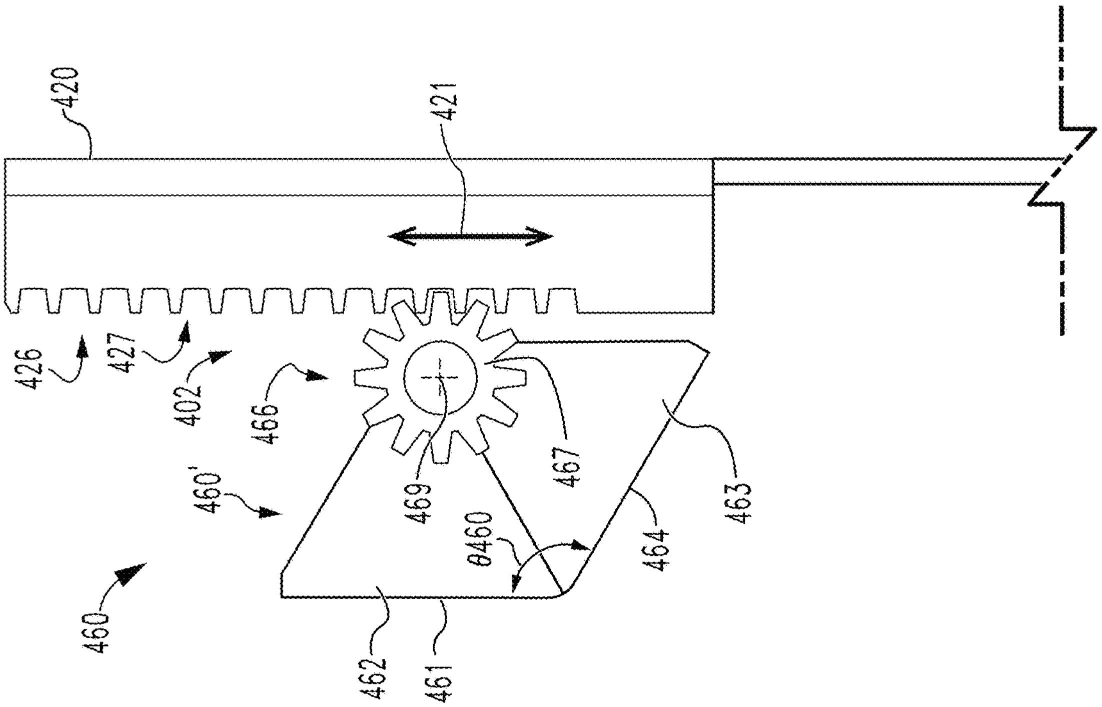
FIG. 17 is a side view of a portion of the trim illustrated in FIG. 16 when the trim is in a first state.

With additional reference to FIGS. 16-18, illustrated therein is a trim 400 according to certain embodiments. The trim 400 is an embodiment of the above-described trim 100, and generally includes a housing 410, a slider 420, a cam 430, an actuator 440, which respectively correspond to the housing 110, slider 120, cam 130, and actuator 140 described above. While not specifically illustrated in FIGS. 16-18, it should be appreciated that the trim 400 may further include a bias mechanism along the lines of the bias mechanism 150. Moreover, while the actuator 440 of the illustrated trim 400 is provided in the form of a lock cylinder, it should be appreciated that the actuator 440 may instead be provided in another form, such as that of a thumbturn or an emergency override. As described herein, the trim 400 further includes an indicator mechanism 460, which is an embodiment of the above-described indicator mechanism 160. In the interest of conciseness, the following description of the trim 400 focuses primarily on features that are different from those described above with reference to the trim 100.

In the illustrated form, the indicator mechanism 460 is provided in the form of a pivoting sign 460' including a first planar face 461 and a second planar face 463 positioned at a non-zero angle θ460 relative to the first planar face 461. In the illustrated form, the angle θ460 is an obtuse angle of about 120°. It is also contemplated that the angle θ460 may be a different obtuse angle, or that the angle θ460 may be an acute angle or a right angle. The first face 461 includes a first indicium 462 relating to a first lockset state, and the second face 463 includes a second indicium 464 relating to a second lockset state. The indicator mechanism 460 further comprises an interface portion 466, which is rotationally coupled with the sign 460' and engages an engagement portion 426 of the slider 420. In the illustrated form, the interface portion 466 comprises a pinion 467 including pinion teeth, the engagement portion 426 comprises a rack 427 including rack teeth, and the rack 427 engages the pinion 467 to thereby define a rack and pinion arrangement 402. While the illustrated arrangement utilizes gear teeth that mesh with one another, it also contemplated that the gear teeth may be omitted. For example, the engagement portion 426 and the interface portion 466 may instead rely upon frictional engagement to pivot the sign 460' in response to linear movement of the slider 420.

The rack and pinion arrangement 402 (or alternatively, a similar arrangement lacking gear teeth) is configured to cause the indicator mechanism 460 to adopt a first indicator state in response to the slider 420 being located in its first linear position (FIG. 17), and to cause the indicator mechanism 460 to adopt a second indicator state in response to the slider 420 being located in its second linear position (FIG. 18). More particularly, the rack and pinion arrangement 402 is configured to rotate and/or pivot the sign 461 about an indicator rotational axis 469 between a first orientation and a second orientation in response to linear movement of the slider 420 along a slider axis 421. In the illustrated form, the indicator rotational axis 469 extends transverse to both the longitudinal axis 401 about which the cam 430 rotates and the sliding axis 421 along which the slider 420 moves.

Figure 20:
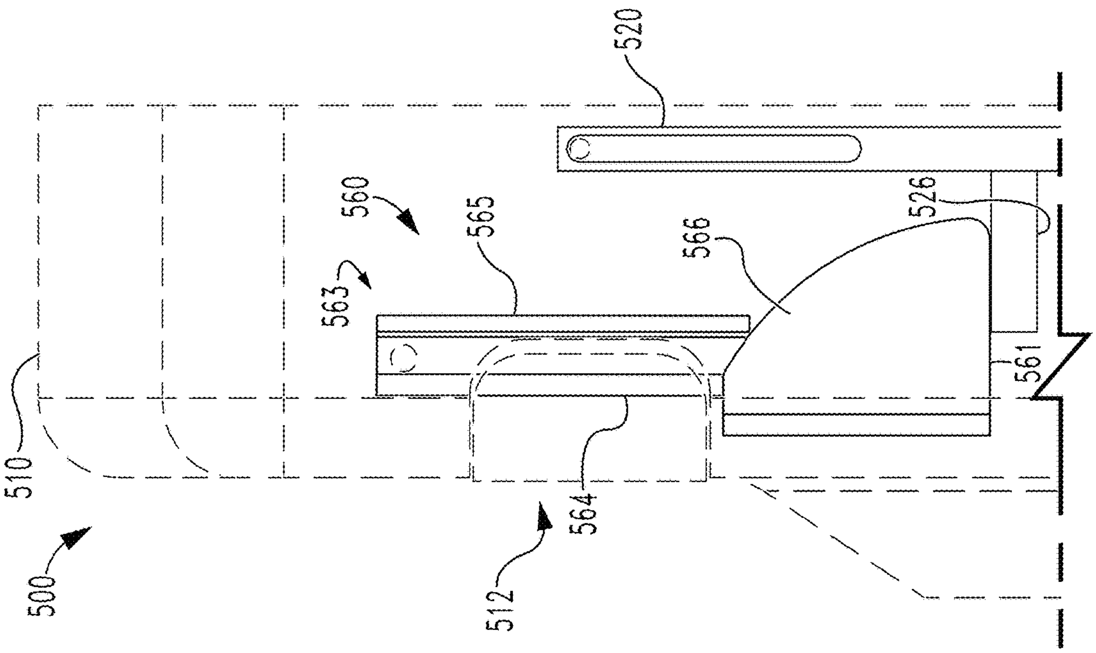
FIG. 20 is a side view of the trim illustrated in FIG. 19 when the trim is in a second state.
Figure 19:
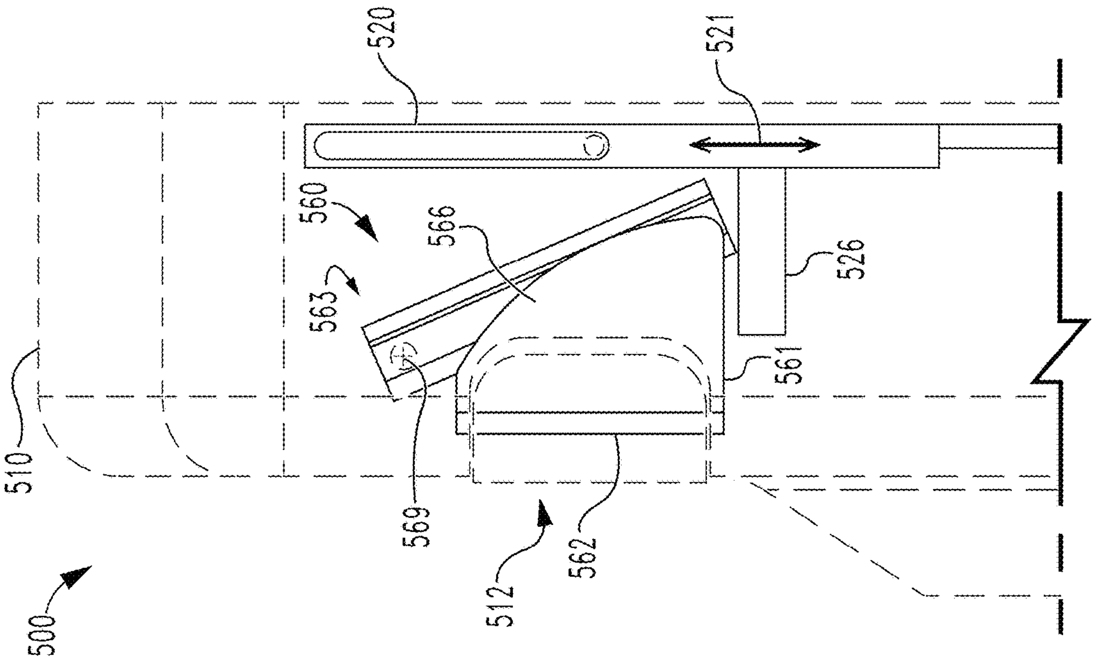
FIG. 19 is a side view of a trim including a split indicator mechanism according to certain embodiments, and illustrates the trim in a first state.

With additional reference to FIGS. 19 and 20, illustrated therein is a trim 500 according to certain embodiments. The trim 500 is an embodiment of the above-described trim 100, and generally includes a housing 510, a slider 520, a cam, and an actuator, which respectively correspond to the housing 110, slider 120, cam 130, and actuator 140 described above. While not specifically illustrated in FIGS. 19 and 20, it should be appreciated that the trim 500 may further include a bias mechanism along the lines of the bias mechanism 150. Moreover, it should be appreciated that the actuator may be provided in the form of a lock cylinder, a thumbturn, or an emergency override. As described herein, the trim 500 further includes an indicator mechanism 560, which is an embodiment of the above-described indicator mechanism 160. In the interest of conciseness, the following description of the trim 500 focuses primarily on features that are different from those described above with reference to the trim 100.

The indicator mechanism 560 generally includes a sliding sign 561 including a first indicium 562, and a pivoting sign 563 including a second indicium 564. The pivoting sign 563 is mounted to the housing 510 for pivotal movement about a pivot axis 569, and includes a flange 565. In the illustrated form, the pivot axis 569 extends transverse to both the longitudinal axis about which the cam rotates and the sliding axis 521 along which the slider 520 moves. The sliding sign 561 is mounted in the housing 510 for sliding movement in a direction along the sliding axis 521, and is engaged with an engagement portion 526 of the slider 520 such that the slider 520 is operable to drive the sliding sign 561 between a first position and a second position. For example, the slider 520 and the sliding sign 561 may be coupled for joint sliding movement. The sliding sign 561 includes a ramp 566 operable to engage the flange 565 to facilitate pivoting of the pivoting sign 563 as described herein.

The trim 500 has a first state (FIG. 19) and a second state (FIG. 20), which respectively correspond to the above-described first state and second state. With the trim 500 in its first state, the indicator mechanism 560 is in the first indicator state, in which the first indicium 562 is visible via the window 512. With the trim 500 in its second state, the indicator mechanism 560 is in the second indicator state, in which the second indicium 564 is visible via the window 512.

FIG. 19 illustrates the trim 500 in its first state, in which the indicator 560 is in the first indicator state. In this arrangement, the sliding sign 561 is aligned with the window 512, and holds the pivoting sign 563 in a pivoted position. For example, the ramp 566 may engage the flange 565 to hold the pivoting sign 563 in its pivoted position. With the sliding sign 561 interposed between the window 512 and the pivoting sign 563, the first indicium 562 is visible via the window 512 to thereby indicate to users that the trim 500 is in its first state.

As the trim 500 transitions from its first state (FIG. 19) to its second state (FIG. 20), the slider 520 moves downward, thereby causing a corresponding downward movement of the sliding sign 561. Movement of the sliding sign 561 from its first position to its second position also causes a corresponding movement of the pivoting sign 563, thereby permitting the pivoting sign 561 to move from its pivoted position to a home position. In certain embodiments, the pivoting sign 561 may be biased toward its home position, for example by gravity and/or a bias mechanism (e.g., a spring).

FIG. 20 illustrates the trim 500 in its second state, in which the indicator 560 is in the second indicator state. In this arrangement, the sliding sign 561 is misaligned with the window 512 and permits the pivoting sign 563 to adopt its home position, in which the front face of the sign 563 is substantially vertical and aligned with the window 512. As a result, the second indicium 564 is visible via the window 512 to thereby indicate to users that the trim 500 is in its second state.

As the trim 500 transitions from its second state (FIG. 20) to its first state (FIG. 19), the slider 520 moves upward, thereby causing a corresponding upward movement of the sliding sign 561. Movement of the sliding sign 561 from its second position to its first position also causes a corresponding movement of the pivoting sign 563. More particularly, as the sliding sign 561 moves upward, the ramp 566 engages the flange 565 and thereby urges the pivoting sign 561 to pivot from its home position to its pivoted position.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as “a,” “an,” “at least one,” or “at least one portion” are used there is no intention to limit the claim to only one item unless specifically stated to the contrary in the claim. When the language “at least a portion” and/or “a portion” is used the item can include a portion and/or the entire item unless specifically stated to the contrary.

What is claimed is:

1. A lockset trim, comprising:

an escutcheon comprising a window;

a cam mounted in the escutcheon for rotation about a longitudinal axis between a first rotational position and a second rotational position;

a slider movably mounted in the escutcheon and engaged with the cam; and an indicator mechanism mounted in the escutcheon for movement between a first indicator state, in which a first indicium is visible via the window, and a second indicator state, in which a second indicium is visible via the window, wherein the indicator mechanism comprises a first portion including the first indicium that is movable relative to a second portion including the second indicium, and wherein with the indicator mechanism in the first indicator state, the second portion is angled relative to the first portion; and wherein the indicator mechanism is engaged with the cam via the slider such that the indicator mechanism adopts the first indicator state in response to the cam adopting the first rotational position and adopts the second indicator state in response to the cam adopting the second rotational position.

2. The lockset trim of claim 1, wherein the slider is engaged with the cam such that the slider moves between a first linear position and a second linear position in response to rotation of the cam between the first rotational position and the second rotational position; and wherein the indicator mechanism is engaged with the slider such that the indicator mechanism moves between the first indicator state and the second indicator state in response to movement of the slider between the first linear position and the second linear position.

3. The lockset trim of claim 2, wherein the cam is engaged with the slider via a one-way engagement such that a tampering force moving the slider from the first slider position to the second slider position does not cause a corresponding movement of the cam from the first rotational position to the second rotational position.

4. The lockset trim of claim 1, further comprising an actuator operable to rotate the cam between the first rotational position and the second rotational position.

5. A lockset trim, comprising:

an escutcheon comprising a window;

a cam mounted in the escutcheon for rotation about a longitudinal axis between a first rotational position and a second rotational position;

a slider movably mounted in the escutcheon and engaged with the cam; and an indicator mechanism mounted in the escutcheon for movement between a first indicator state, in which a first indicium is visible via the window, and a second indicator state, in which a second indicium is visible via the window, wherein the indicator mechanism comprises a first portion including the first indicium that is movable relative to a second portion including the second indicium;

wherein the indicator mechanism is engaged with the cam via the slider such that the indicator mechanism adopts the first indicator state in response to the cam adopting the first rotational position and adopts the second indicator state in response to the cam adopting the second rotational position; and wherein the slider is configured to rotate or pivot at least one of the first portion and the second portion of the indicator mechanism about an indicator axis in response to rotation of the cam about the longitudinal axis, and wherein the indicator axis is transverse to the longitudinal axis.

6. The lockset trim of claim 5, wherein the slider is mounted for sliding movement along a sliding axis transverse to the longitudinal axis; and wherein the indicator axis is transverse to the sliding axis.

7. The lockset trim of claim 5, wherein with the indicator mechanism in the first indicator state, the second portion is angled relative to the first portion.

8. A lockset trim, comprising:

an escutcheon comprising a window;

a cam mounted in the escutcheon for rotation about a longitudinal axis between a first rotational position and a second rotational position;

a slider movably mounted in the escutcheon and engaged with the cam; and an indicator mechanism mounted in the escutcheon for movement between a first indicator state, in which a first indicium is visible via the window, and a second indicator state, in which a second indicium is visible via the window;

wherein the indicator mechanism is engaged with the cam via the slider such that the indicator mechanism adopts the first indicator state in response to the cam adopting the first rotational position and adopts the second indicator state in response to the cam adopting the second rotational position;

wherein the indicator mechanism comprises a first sign including the first indicium, and a second sign including the second indicium;

wherein the first sign and the second sign are movable relative to one another; and wherein, with the indicator mechanism in the first indicator state, the second sign is angled relative to the first sign.

9. A lockset trim, comprising:

a housing comprising a window;

a cam mounted in the housing for rotation about a longitudinal axis between a first rotational position and a second rotational position;

a slider movably mounted in the housing and engaged with the cam such that rotation of the cam between the first rotational position and the second rotational position causes a corresponding movement of the slider between a first slider position and a second slider position; and an indicator mechanism movably mounted in the housing, the indicator mechanism comprising a first sign and a second sign movable relative to the first sign, wherein the indicator mechanism has a first indicator state in which the first sign is visible via the window and the second sign is angled relative to the first sign, and a second indicator state in which the second sign is visible via the window;

wherein the first sign is engaged with the slider such that the indicator mechanism moves between the first indicator state and the second indicator state in response to movement of the slider between the first slider position and the second slider position.

10. The lockset trim of claim 9, wherein the slider is mounted for linear movement along a slider axis between the first slider position and the second slider position.

11. The lockset trim of claim 10, wherein the first sign is engaged with the slider for joint movement along the slider axis.

12. The lockset trim of claim 9, wherein the second sign is mounted for pivotal movement relative to the first sign about a pivot axis that extends transverse to the longitudinal axis.

13. The lockset trim of claim 12, wherein the first sign and a second sign are connected to one another by a hinge.

14. The lockset trim of claim 9, further comprising a guide track engaged with the indicator mechanism and configured to guide movement of the indicator mechanism between the first indicator state and the second indicator state.

15. The lockset trim of claim 14, wherein the first sign and the second sign are pivotably coupled to one another.

16. The lockset trim of claim 14, wherein the guide track comprises a straight section and a jog;

wherein, with the indicator mechanism in the first indicator state, the first sign is engaged with the straight section and the second sign is engaged with the jog; and wherein, with the indicator mechanism in the second indicator state, each of the first sign and the second sign is engaged with the straight section.

17. A lockset trim, comprising:

a housing comprising a window;

a cam rotatably mounted in the housing for rotation about a longitudinal axis between a first rotational position and a second rotational position;

a slider mounted in the housing and engaged with the cam such that rotation of the cam between the first rotational position and the second rotational position causes a corresponding movement of the slider along a slider axis between a first slider position and a second slider position, wherein the slider axis is transverse to the longitudinal axis; and an indicator mechanism mounted in the housing for movement between a first indicator position, in which a first indicium is visible via the window, and a second indicator position, in which a second indicium is visible via the window, wherein a first portion of the indicator mechanism including the first indicium is movable about an indicator axis relative to a second portion of the indicator mechanism including the second indicium, wherein the indicator axis is transverse to each of the longitudinal axis and the slider axis, and wherein the indicator mechanism is engaged with the slider such that the indicator mechanism adopts the first indicator state in response to the first slider position, and adopts the second indicator state in response to the second slider position.

18. The lockset trim of claim 17, wherein the first portion of the indicator mechanism pivots relative to the second portion of the indicator mechanism about the indicator axis in response to sliding movement of the slider along the slider axis.

19. The lockset trim of claim 17, wherein the first indicium and the second indicium pivot relative to one another about the indicator axis.

20. The lockset trim of claim 17, wherein the first portion of the indicator mechanism is connected to the second portion of the indicator mechanism by a hinge.

21. The lockset trim of claim 17, wherein the indicator mechanism comprises a sign including a first face including the first indicium, and a second face including the second indicium; and wherein the first face and the second face define an oblique angle relative to one another when the indicator mechanism is in the second indicator position.

* * * * *